(12) United States Patent
Meaige et al.

(10) Patent No.: US 11,060,543 B2
(45) Date of Patent: Jul. 13, 2021

(54) DEVICE AND METHOD OF APPLYING A SEALANT AROUND A STRUCTURAL ADHESIVE TO PREVENT CORROSION (71) Applicant: Honda Motor Co., Ltd., Tokyo (JP)

(72) Inventors: Benjamin J. Meaige, Powell, OH (US); Eric J. Boettcher, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 120 days.

(21) Appl. No.: 16/174,861

(22) Filed: Oct. 30, 2018

(65) Prior Publication Data
US 2019/0203754 A1 Jul. 4, 2019

Related U.S. Application Data (60) Provisional application No. 62/611,213, filed on Dec. 28, 2017.

(51) Int. Cl.
F16L 11/00 (2006.01)
F16B 11/00 (2006.01)
F16B 33/00 (2006.01)
B62D 27/02 (2006.01)
B62D 25/02 (2006.01)
(Continued)

(52) U.S. Cl.
CPC .......... F16B 11/006 (2013.01); B62D 25/025 (2013.01); B62D 27/026 (2013.01); F16B 33/004 (2013.01); B62D 27/06 (2013.01); F16B 5/08 (2013.01); F16B 2200/50 (2018.08)

(58) Field of Classification Search
CPC .. F16B 11/006; F16B 33/004; F16B 2200/50; F16B 5/08; B62D 27/026; B62D 25/025; B62D 27/06
See application file for complete search history.

(56) References Cited

U.S. PATENT DOCUMENTS 3,350,536 A 10/1967 Bush et al.
4,010,703 A 3/1977 Spiekermann, III et al.
(Continued)

FOREIGN PATENT DOCUMENTS

FR 2981866 5/2013
JP 10-258331 A * 9/1998
(Continued)

OTHER PUBLICATIONS

Machine Translation of Japanese Patent 2011-168156, Date Unknown.*
Machine Translation of Japanese Patent 10-258331, Date Unknown.*

Primary Examiner — Jeffry H Aftergut
(74) Attorney, Agent, or Firm — Rankin, Hill & Clark LLP (57) ABSTRACT A method of joining first and second vehicle components to make an assembly includes applying structural adhesive and mastic to the first component. The first and second component may be made of different metals, and are brought together and joined at an interface using a linkage. Thereafter, the structural adhesive and mastic are cured. The mastic seals an interior edge of the interface, which is located at an interior of the assembly. A dust sealer is applied and cured to seal the exterior edge of the interface, which is located at an exterior of the assembly. The method results in sealing of all the edges around the entire perimeter of the interface, thus inhibiting water intrusion into the interface and possible corrosion resulting therefrom.

9 Claims, 6 Drawing Sheets (51) Int. Cl.
*F16B 5/08* (2006.01)
*B62D 27/06* (2006.01)

(56) References Cited

U.S. PATENT DOCUMENTS

| | | | |
|---|---|---|---|
| 4,964,362 A * | 10/1990 | Dominguez | B05C 5/0216 |
| | | | 118/315 |
| 6,000,118 A | 12/1999 | Biernat et al. | |
| 6,045,196 A | 4/2000 | Mason | |
| 7,004,536 B2 | 2/2006 | Wieber | |
| 7,043,816 B2 * | 5/2006 | Zaluzec | B21D 39/021 |
| | | | 29/460 |
| 7,090,112 B2 | 8/2006 | Masingale | |
| 7,521,093 B2 | 4/2009 | Finerman et al. | |
| 7,984,919 B2 | 7/2011 | Nitsche et al. | |
| 8,114,242 B2 | 2/2012 | Cai et al. | |
| 8,636,197 B1 | 1/2014 | Hill et al. | |
| 8,840,749 B2 * | 9/2014 | Song | B21D 39/02 |
| | | | 156/202 |
| 8,973,809 B2 | 3/2015 | Hill et al. | |
| 9,016,973 B2 | 4/2015 | Apfel | |
| 9,169,860 B2 | 10/2015 | Itoh et al. | |
| 9,440,683 B1 | 9/2016 | Donabedian | |
| 9,610,981 B1 | 4/2017 | Bach et al. | |
| 9,713,949 B2 | 7/2017 | Kamimura et al. | |
| 9,751,571 B2 * | 9/2017 | Iwase | B60J 5/0469 |
| 10,195,837 B2 * | 2/2019 | Morral | B32B 37/30 |
| 2008/0047222 A1 | 2/2008 | Barnes | |
| 2011/0271728 A1 * | 11/2011 | Vanimisetti | B21D 39/021 |
| | | | 72/46 |
| 2015/0158282 A1 | 6/2015 | Morral et al. | |
| 2016/0167158 A1 * | 6/2016 | Spinella | B23K 11/18 |
| | | | 403/270 |

FOREIGN PATENT DOCUMENTS

| | | |
|---|---|---|
| JP | 2011-168126 A * | 9/2011 |
| WO | 20150166149 | 11/2015 |
| WO | 20160120027 | 8/2016 |
| WO | 20170157634 | 9/2017 |

* cited by examiner

DEVICE AND METHOD OF APPLYING A SEALANT AROUND A STRUCTURAL ADHESIVE TO PREVENT CORROSION

CROSS-REFERENCE TO RELATED APPLICATION

The present application claims priority to U.S. Provisional Patent Application Ser. No. 62/611,213 filed on Dec. 28, 2017, which is incorporated herein by reference.

BACKGROUND

During vehicle assembly processes where two parts are joined, a structural (crash toughened) adhesive may be applied to a joint in between the two parts. Welds, typically spot welds, are made to the joint, and the parts are advanced through the assembly process and the structural adhesive is cured.

It has been determined that when two parts (especially those made of dissimilar metals) are joined with the structural adhesive and welds, the adhesive initially occupies the space between the surfaces of the welded parts. Eventually however, the structural adhesive can begin to pull away from one or both of the surfaces during the lifetime of the vehicle due to vibration or other reasons, and one or more gaps forms between the welded parts by which electrolyte (e.g. water) enters between the two parts. The electrolyte can then contact surfaces of the two parts that are not e-coated and therefore cause galvanic corrosion.

To block such gaps between the two welded parts and to prevent water infiltration, a mastic (anti-flutter sealant) or dust sealer may be subsequently applied along an edge of the welded joint so as to block the gaps that may form in the structural adhesive and thereby isolate the uncoated surfaces of the two parts from water. The mastic creates a water tight seal at the edges of the welded joint so that electrolyte cannot enter between the two welded parts and corrode them.

However, because of the arrangement of welded parts in vehicle structures, it is not always possible to apply mastic sealant around the entire perimeter of the welded joint to prevent water ingress between the two welded parts. For example, a welded joint between the two welded parts may have one accessible edge that can be reached by robots used for applying the mastic, but may have another restricted edge that is not accessible to the robots for applying mastic. Therefore, it may only be possible to apply mastic at the accessible edge using such robots. The restricted edges that do not have mastic applied as a sealant may therefore develop gaps where electrolyte can enter and cause corrosion to the welded parts.

BRIEF DESCRIPTION

According to one aspect, a method of joining a first component including a first metal and a second component including a second metal different from the first metal, includes applying a first bead of an adhesive and a second bead of a sealant to the first component. The first component is brought together with a second component such that the adhesive is arranged at an interface between the first and second components, and the sealant covers at least one edge of the interface. The first and second components are joined together at the interface, and the adhesive and the sealant are cured such that the cured sealant seals the at least one edge of the interface. After the first component and the second component are joined, the at least one edge is arranged in an interior defined by the first component and the second component.

The method may further include after joining, applying a third bead of a sealer to cover at least one other edge of the interface and curing the sealer. The method may allow for all edges of the interface to be sealed.

According to another aspect, a multi-material assembly includes a first component including a first metal joined at an interface to a second component including a second metal different from the first metal. A cured adhesive is arranged between the first and second components at the interface. A cured sealant covers at least one edge of the interface, the at least one edge being arranged in an interior defined by the first component and the second component. A cured sealer covers at least one other edge of the interface, the at least one other edge of the interface being arranged at an exterior defined by the first component and the second component. The cured sealant, the cured sealer, the first component, and the second component collectively form a closed volume around the cured adhesive. The assembly may be incorporated into a vehicle.

According to another aspect, a dispensing tool includes a first delivery pathway connecting to a first reservoir containing an adhesive. The first delivery pathway includes a first dispensing nozzle, the first dispensing nozzle being configured to dispense a first bead of the adhesive. The dispensing tool includes a second delivery pathway separate and distinct from the first delivery pathway. The second delivery pathway connects to a second reservoir containing a sealant and includes a second dispensing nozzle. The second dispensing nozzle is spaced from the first dispensing nozzle by a predetermined distance, and is configured to dispense a second bead of the sealant. The second bead is separate and distinct from the first bead. The dispensing tool includes one or more sensors configured to monitor dispensing of the first and second beads. The dispensing tool may be included on the end of a robotic arm tooling.

DETAILED DESCRIPTION

The present subject matter relates to an assembly including a sealed interface between a first component and a second component, a related method for making the assembly, and a related tool used for making the assembly. As used herein, "seal", "sealer", "sealant", "sealed", "sealing" or cognate terms mean a barrier, a composition used to create a barrier, an area that has a barrier around it, or the creation of a barrier, which barriers inhibit water or other electrolyte from passing therethrough, for example, inhibiting water from contacting a sealed area (e.g. sealed interface). A sealer or sealant may be water resistant or water impermeable and may be used to create a water-tight or water-proof seal.

The sealed interface is formed between two joined components of dissimilar materials (e.g. different metals). The assembly includes a sealant (referred to herein as "mastic") and an adhesive (referred to herein as "structural adhesive") that are applied to one of the two components before the two components are joined to form the assembly. After the two components are joined, a sealer (referred to herein as "dust sealer") is applied to seal an exposed edge (referred to herein as "exterior edge") of the assembly.

Figure 1:
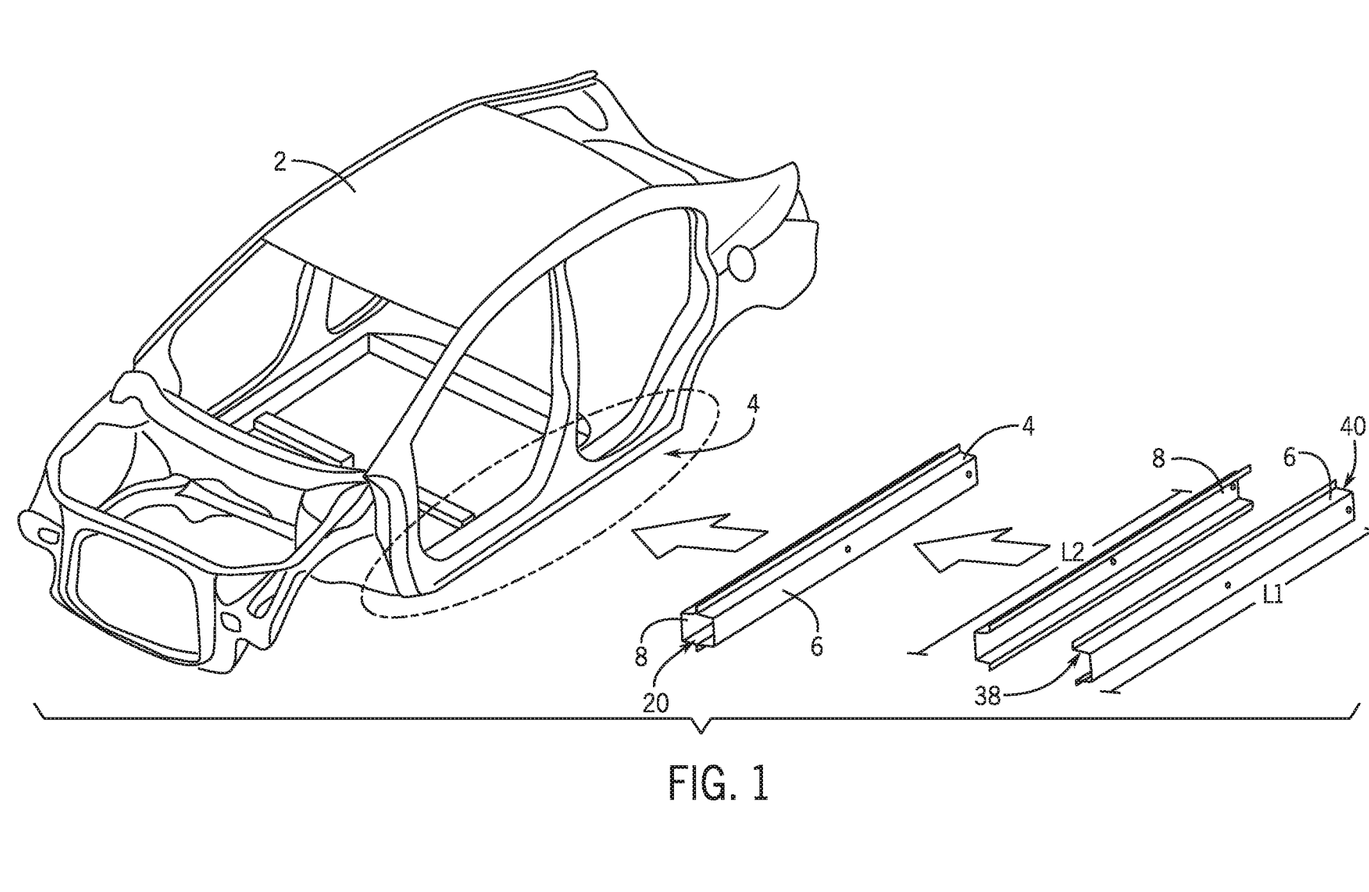
FIG. 1 is a perspective view of a vehicle including a vehicle assembly in accordance with the present subject matter.

Referring to the figures, a vehicle 2 includes an assembly 4 (also referred to herein as "multi-material assembly" or "vehicle assembly"), which includes a first component 6 joined with a second component 8. The vehicle 2 is not particularly limited, and can include an automobile, aircraft, watercraft, or personal transportation vehicle. The vehicle assembly 4 is also not particularly limited, and can include a frame member used as an integral structural element of the vehicle 2 as shown in FIG. 1, or can include another portion of a vehicle 2 including an interior or exterior trim piece that is not necessarily a structural element of the vehicle 2.

The assembly 4 includes the first component 6 (also referred to herein as "first vehicle component") joined to the second component 8 (also referred to herein as "second vehicle component") at an interface 10. The components 6, 8 are joined at the interface 10 by a structural adhesive 12, and may further be joined by one or more linkages 14. The linkages 14 extends through the structural adhesive 12 and join the first component 6 and the second component 8 together. The interface 10 is sealed against intrusion by an electrolyte (e.g. water) with a mastic 16 and a dust sealer 18, which collectively seal all edges of the interface 10 and collectively form a sealed perimeter around the structural adhesive 12.

The first and second components 6, 8 can be made from the same or dissimilar materials. In an exemplary embodiment, the assembly 4 is a multi-material assembly 4, where the first component 6 comprises a first metal and the second component 8 comprises a second metal that is different from the first metal. The first component 6 may comprise or consist of aluminum or aluminum alloy, and the second component 8 may comprise or consists of steel. The steel second component 8 may have a thinner gauge than the aluminum first component 6. The dissimilar materials between the first and second components 6, 8 may make them susceptible to galvanic corrosion when joined and if exposed to an electrolyte at the interface 10, and therefore the first and second components 6, 8 may benefit from the sealing of the interface 10. Alternatively, the second component 8 may comprise or consist of a fiber reinforced composite panel, including fiber (e.g. glass, aramid, etc.) dispersed in a cured polymer matrix.

Figure 2:
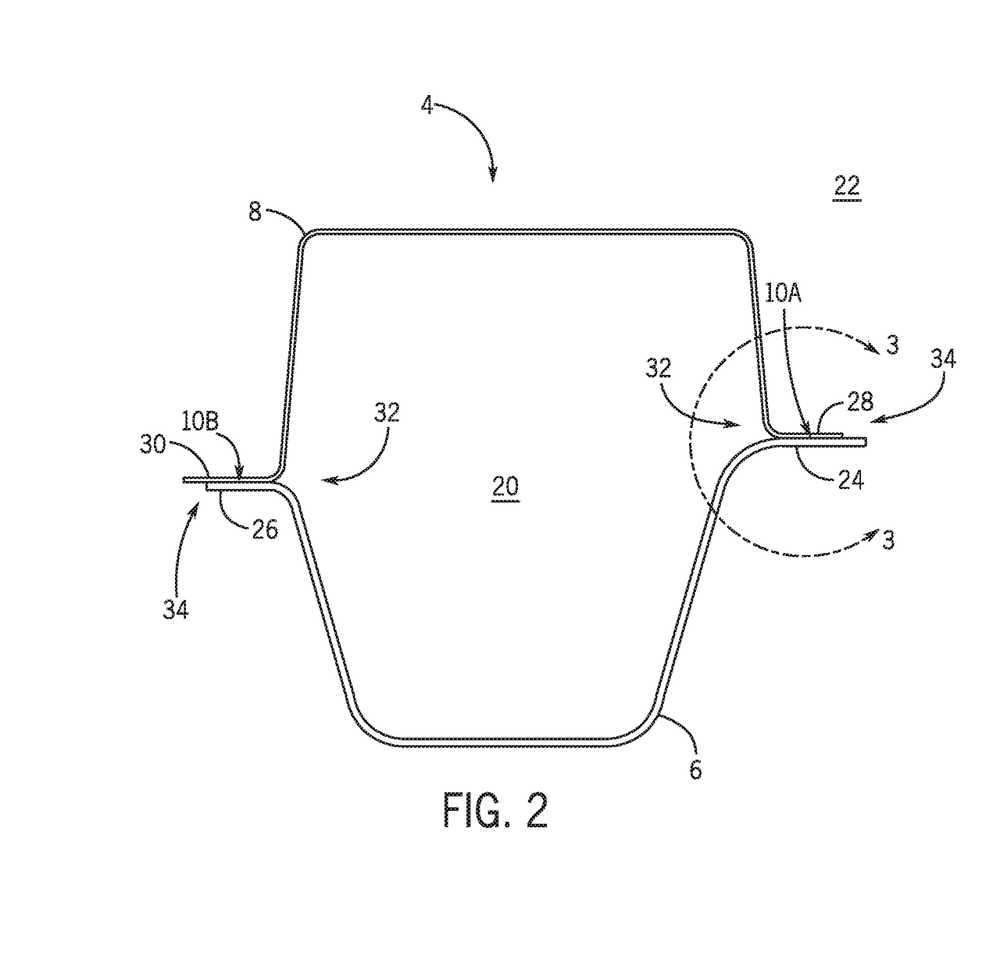
FIG. 2 is a cross-sectional view of a vehicle assembly in accordance with the present subject matter.

A shape of the first component 6 and a shape of the second component 8 are not particularly limited by the present subject matter, and can include elongated pieces of material having a contoured cross-section. As shown in FIG. 2, the first and second components 6, 8 have different cross-sectional shapes. However, this is not required, and the first and second components 6, 8 can instead have identical cross-sectional shapes.

When the first and second components 6, 8 are brought together, the first and second components 6, 8 may define an interior 20 between them, and define an exterior 22 that is not between the first and second components 6, 8.

Figure 5:
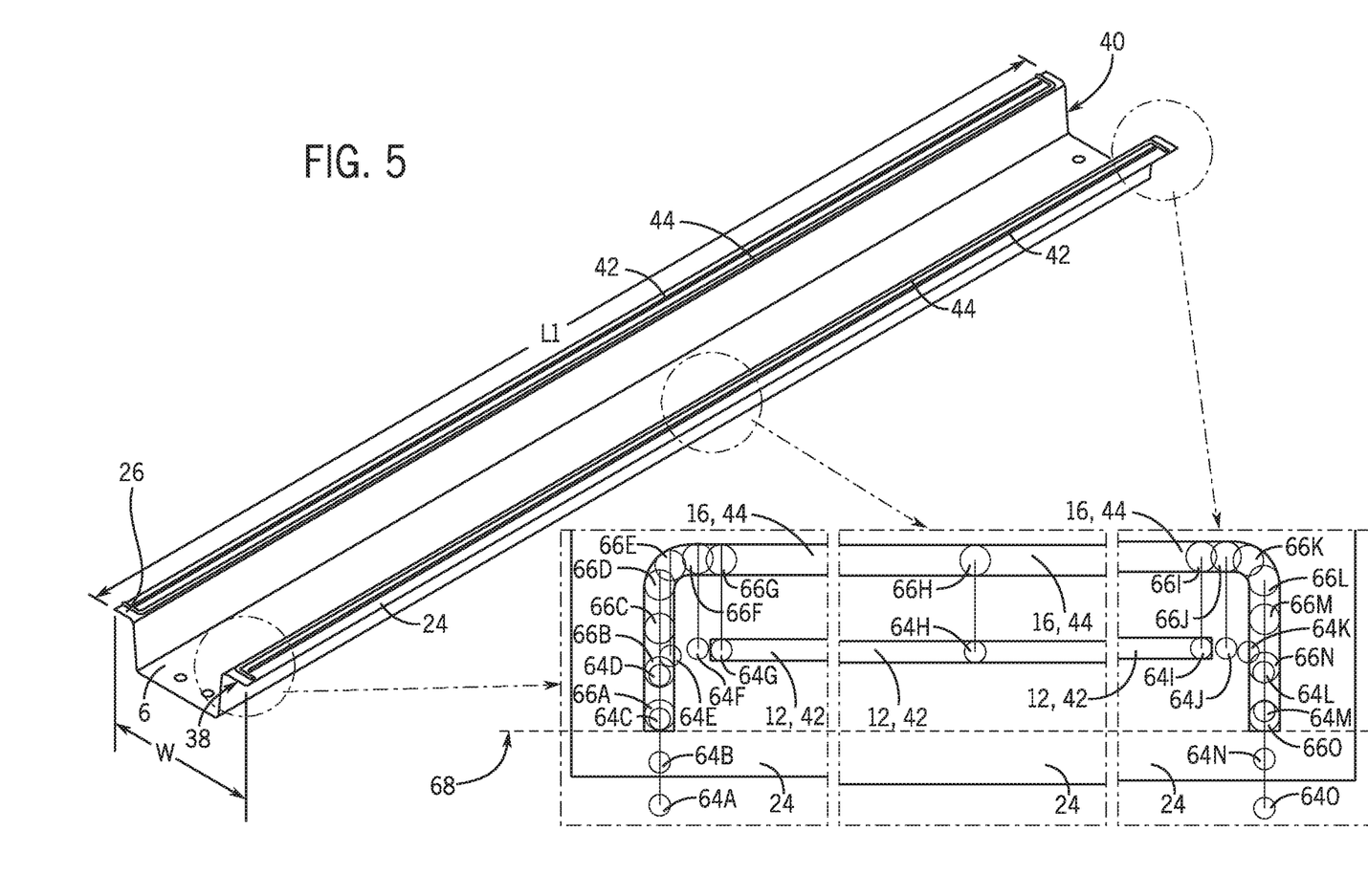
FIG. 5 is a perspective view of one component of a vehicle assembly including beads of adhesive and sealant, and a detailed view of an application pathway for applying the beads to the component in accordance with the present subject matter.
Figure 6A:
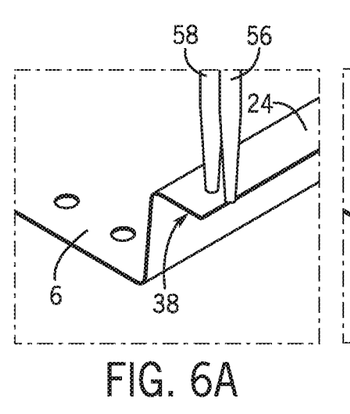
FIGS. 6A-6H are perspective views of a process of applying beads of adhesive and sealant to a component of a vehicle assembly in accordance with the present subject matter.
Figure 6B:
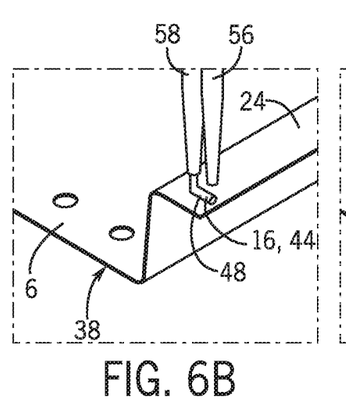
Figure 6C:
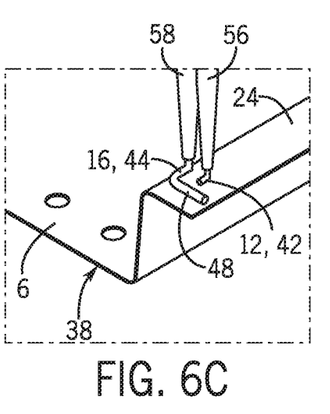
Figure 6D:
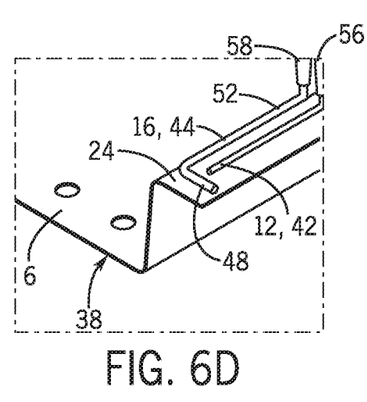
Figure 6E:
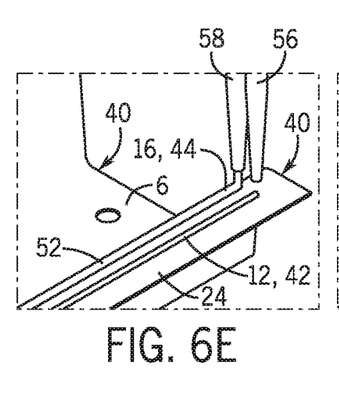
Figure 6F:
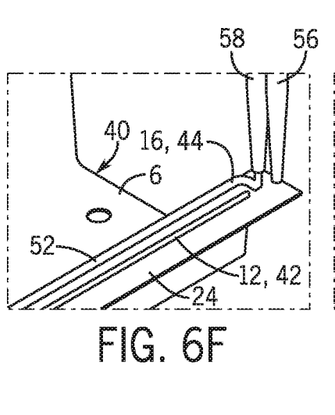
Figure 6G:
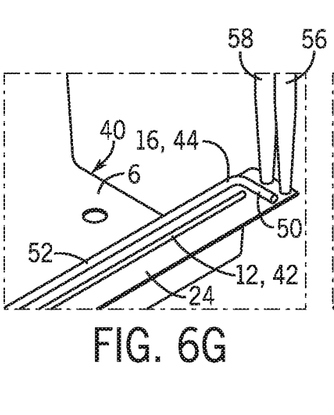
Figure 6H:
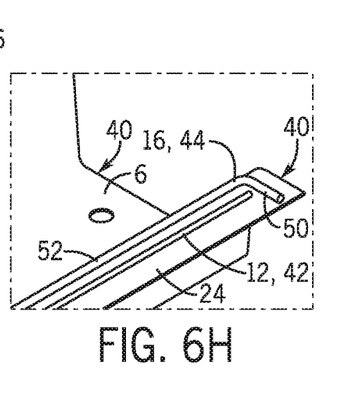
Figure 7A:
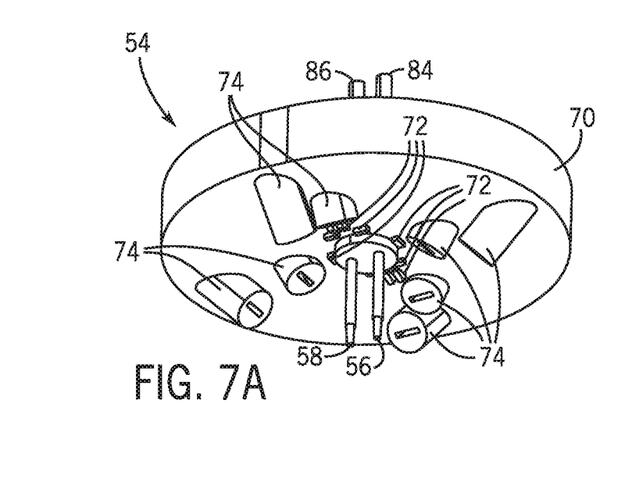
FIGS. 7A-7D are perspective views of an applicator head for applying beads of adhesive and sealant to a component of a vehicle assembly in accordance with the present subject matter.
Figure 7B:
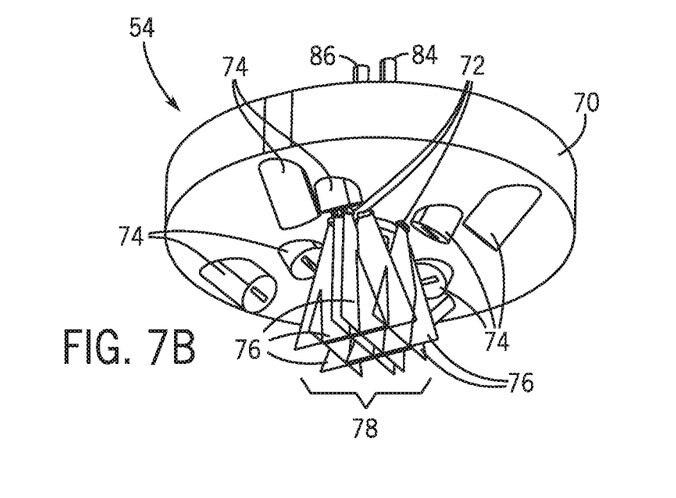
Figure 7C:
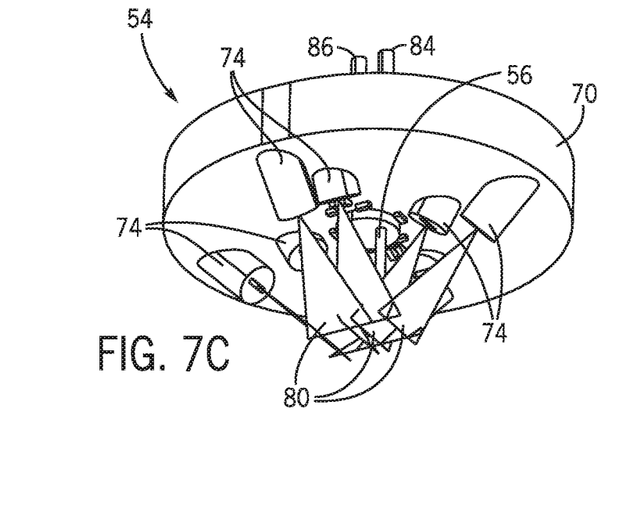
Figure 7D:
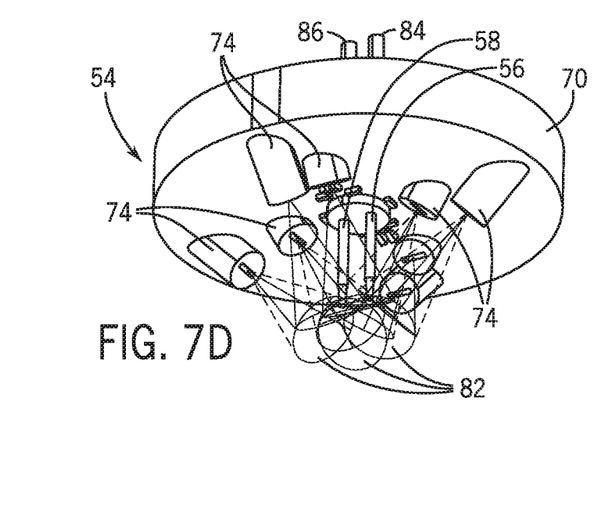

The first component 6 includes two flanges 24, 26, which can be arranged on opposite sides thereof and extend along the entire length $L_1$ of the first component 6. The second component 8 can also include two flanges 28, 30, which can be arranged on opposite sides thereof and extend along the entire length $L_2$ of the second component 8. Although the detailed portions of FIG. 5 and FIG. 6 depict only a first flange 24 of the first component 6, this is only for convenience, and it will be understood that such details may also be considered to depict the same or similar details with respect to a second flange 26 of the first component 6. Furthermore, although FIGS. 5 and 6 only depict the first component 6, this is only for convenience, and it will be understood that FIGS. 5 and 6 may also be considered to depict the same or similar details with respect to the second component 8.

Figure 3:
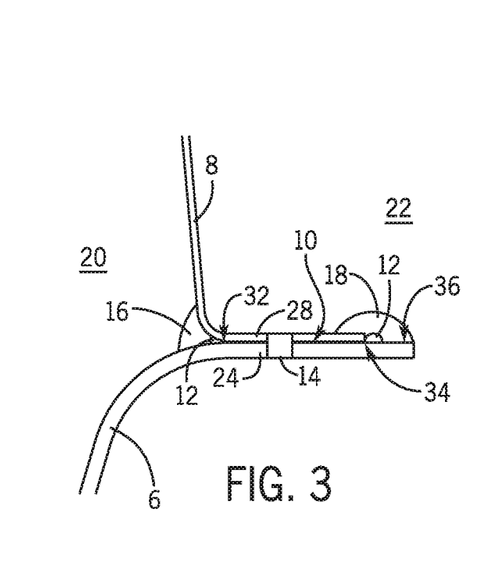
FIG. 3 is a cross-sectional view of a portion of a vehicle assembly in accordance with the present subject matter.

As depicted in FIG. 2, the assembly 4 is formed by mating the first flange 24 of the first component 6 with a third flange 28 of the second component 8, and mating the second flange 26 of the first component 6 with a fourth flange 30 of the second component 8. Although only mating flanges 24, 28 are depicted in FIGS. 3 and 4, it will be understood that these figures may also be considered to depict the same or similar features with respect to the mating flanges 26, 30. The assembly 4 may include two interfaces 10A and 10B, with a first interface 10A between mating flanges 24, 28, and a second interface 10B between mating flanges 26, 30.

When the components 6, 8 are joined, the interface 10 may define an interior edge 32 on a side of the interface 10 closest to the interior 20, and an exterior edge 34 on a side of the interface 10 closest to the exterior 22. The interface 10 may include other edges near the ends of the components 6, 8, for example near the first end 38 and second end 40 of the first component 6.

The mating flanges 24, 28 and 26, 30 may be sized or joined so as to provide a surface 36 that extends away from exterior edge 34 of the interface 10, and upon which the dust sealer 18 is applied. In one embodiment, the surface 36 is provided by the first flange 24 extending away from the first component 6 by a greater distance (i.e. is wider) than does the third flange 28 from the second component 8. Similarly, the fourth flange 30 extends away from the second component 8 by a greater distance (i.e. is wider) than does the second flange 26 from the first component 6.

The structural adhesive 12 is arranged at the interface 10 between the first and second components 6, 8 and contacts the first and second components 6, 8. The structural adhesive 12 may prevent direct contact between the first and second components 6, 8, or may allow for direct contact between the first and second components 6, 8. In one non-limiting example, the first component 6 directly contacts the second component 8 only at areas adjacent to the linkages 14. This contact between the first and second components 6, 8 may be a result of the linkage 14, for example a self-piercing rivet, pulling together the first and second components 6, 8 in that area.

The structural adhesive 12 is used to increase the strength of the joint formed between the first and second components 6, by taking up stresses in the interface 10 between the linkages 14. The structural adhesive 12 may, but is not required to, provide a stronger bond between the first and second components 6, 8 than the mastic 16 and dust sealer 18. The structural adhesive 12 may be more rigid when cured than the mastic 16 and dust sealer 18, and thus may form small cracks or gaps within its mass when subject to stresses. These cracks and gaps may provide an avenue for water intrusion into the interface 10. However, the structural adhesive 12 is designed to maintain adhesion with the first and second components 6, 8 even when subject to stresses and along with the linkages 14, keep the first and second components 6, 8 joined at the interface 10. To prevent water intrusion into the cracks or gaps that may form in the structural adhesive 12, the mastic 16 and dust sealer 18 are used to the seal the interface from water intrusion.

The structural adhesive 12 may not be water resistant or water impermeable due to the crack or the gaps that may form in the structural adhesive 12. The structural adhesive 12 is not particularly limited, and may include but is not limited to one or more of a crash toughened adhesive including an epoxy with rubber groups for improving resistance of the vehicle assembly 4 to deformation in a vehicle crash situation; or a high performance adhesive including an epoxy without rubber groups for adding stiffness to the vehicle assembly 4. Other adhesives may be used.

The linkages 14 extend through the structural adhesive 12, and can include mechanical fasteners or welds. Mechanical fasteners can include, but are not limited to, screws, bolts, self-piercing rivets, flow drilling screws, or the like. Welds can include those made by fusion welding or solid-state welding, and include, but are not limited to, spot-welds, friction stir welds, ultrasonic welds, plug welds, bead welds, seam welds, etc.

The linkages 14 may be arranged in or on the flanges 24, 26, 28, 30 as depicted, and are used to more securely join the first and second components 6, 8 to each other at the interface 10, as compared to merely joining with the structural adhesive 12. The linkages 14 may extend along an entire length $L_1$ of the first component 6 and along an entire length $L_2$ of the second component 8 (e.g. seam welds), or the linkages 14 may be spaced along these lengths $L_1$, $L_2$ at regular or irregular intervals (e.g. spot welds or self-piercing rivets). In one embodiment self-piercing rivets are used to join the first and second components 6, 8 at their respective flanges 24, 26, 28, 30.

The mastic 16 contacts the first and second components 6, 8, and covers, and thereby seals, at least one edge of the interface 10, e.g. the interior edge 32. The mastic 16 also covers the structural adhesive 12 that has seeped out from between the interface 10 at the interior edge 32. The mastic 16 may also cover, and thus seal, other edges of the interface 10, for example edges near the first and second ends 38, 40 of the first component 6.

The mastic 16 is used to create a water tight seal along the entire interior edge 32 of the interface 10 between the first and second components 6, 8. The mastic 16 may also be used as an anti-flutter sealer to inhibit vibration in the assembly 4. The mastic 16 is not particularly limited, and may itself be water-proof or water-resistant, and may include a rubber based-sealer used for water tightness.

The dust sealer 18 contacts the first and second components 6, 8. The dust sealer 18 covers, and thus seals, at least one edge of the interface 10 (e.g. the exterior edge 34) other than that sealed by the mastic 16. The dust sealer 18 may also cover the structural adhesive 12 that seeps out from the interface 10 at the exterior edge 34. In this way, the dust sealer 18, in combination with the mastic 16, seals all the edges around the perimeter of the interface 10 to thereby inhibit the intrusion of water or other electrolyte into the interface 10. In other words, the mastic 16, the dust sealer 18, the first component 6, and the second component 8 collectively form a closed volume around the structural adhesive 12.

The dust sealer 18 may be arranged on the surface 36 of the first flange 24, which surface 36 extends from the interface 10 and past the third flange 28. The dust sealer may also be arranged on top of the third flange 28 as depicted in FIGS. 3 and 4G.

The dust sealer 18 is used to create a water tight seal along the entire exterior edge 34. The dust sealer 18 is not particularly limited, and may itself be water-proof or water-resistant, and may include a rubber-based sealer used for water tightness.

With particular reference to FIGS. 4-6, a method of joining the first component 6 and the second component 8 will be discussed with respect to creating and sealing one interface 10 (e.g. the first interface 10A). However, it will be understood that the method can include creating and sealing additional interfaces (e.g. the second interface 10B) between the first and second components 6, 8 in the same or similar manner as described for creating one interface 10.

The first and second components 6, 8 can be, for example, vehicle components. The assembly 4 formed from joining the first and second components 6, 8 can be used to construct a vehicle 2. The method may be used with other configurations of components, including those that do not define an interior and exterior, and including a configuration where a single component is joined to itself, for example, where a first edge of the single component is joined to a second edge of the same component. In accordance with the present subject matter, the assembly 4 may be included as a rocker or side sill of the vehicle 2, or the assembly 4 may take on other arrangements and is not limited to those depicted in the figures.

The method may be performed as part of the production of the vehicle assembly 4, and as part of the production of the vehicle 2 including the vehicle assembly 4. Such method may include further steps such as e-coating, painting, one or more heating cycles, and other conventional vehicle production processes.

The method is described herein as being used to produce the vehicle assembly 4 that is used to make the vehicle 2. However, it will be appreciated that the method may be performed to produce other types of assemblies that are not necessarily used in vehicle construction, and may be performed on different types of interfaces than the flange joint depicted in the figures, including for forming a butt joint, tee joint, lap joint, corner joint, or edge joint.

The method includes applying the structural adhesive 12 and mastic 16 to at least one of the first component 6 and the second component 8. In an exemplary embodiment, the structural adhesive 12 is applied to only one of the first and second components 6, 8. The structural adhesive 12 and mastic 16 may be applied simultaneously or at different times by one or more dispensing tools. The structural adhesive 12 and mastic 16 may be applied to the first flange 24 of the first component 6. The first flange 24 may be wider than the third flange 28 of the second component 8. However, this is not necessary, and the method may involve applying the structural adhesive 12 and mastic 16 to a narrower or equally as wide flange on the first component 6 than on the second component 8. The method is not limited to the relative size of flanges depicted in the figures, and can be performed on other flanges of different relative sizes, including between two flanges of the same size, or not applied to flanges at all.

The method includes applying a first bead 42 of the structural adhesive 12 and a second bead 44 of the mastic 16 to the first flange 24 of the first component 6. The structural adhesive 12 and mastic 16 may also be applied to the second flange 26 (FIG. 5), which may be narrower than the fourth flange 30 of the second component 8. Alternatively, the first bead 42 may be applied to the first component 6 while the second bead 44 may be applied to the second component 8, or vice versa.

The first bead 42 of structural adhesive 12 and the second bead 44 of mastic 16 may each be applied in a continuous line as depicted, or in intermittent or discontinuous islands. In one embodiment, at least the second bead 44 of mastic 16 is applied in a continuous line in order to subsequently seal the entire interior edge 32 of the interface 10.

Figure 4A:
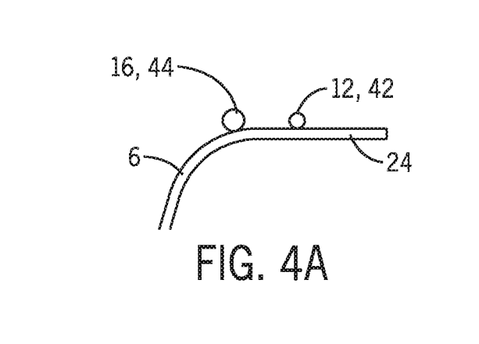
FIGS. 4A-4G are cross-sectional views of a process of joining two components to form a vehicle assembly in accordance with the present subject matter.
Figure 4B:
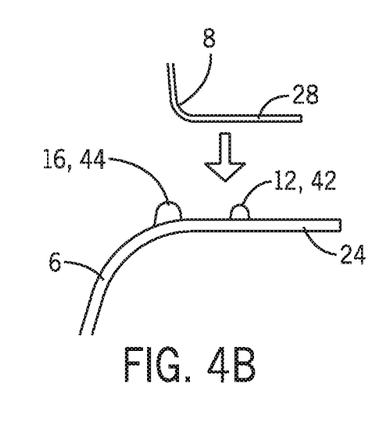
Figure 4C:
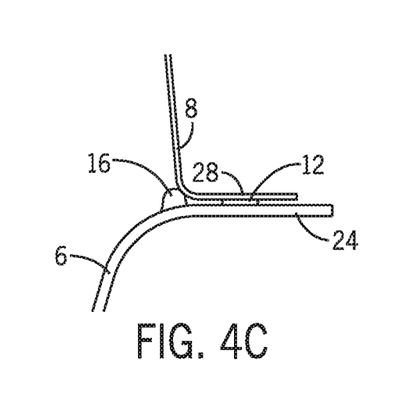
Figure 4D:
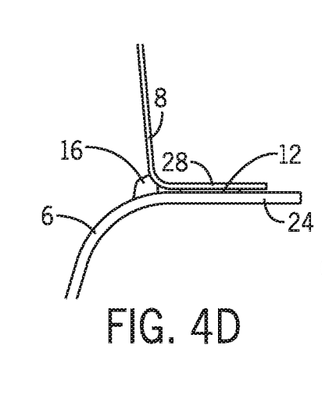

The structural adhesive 12 and the mastic 16 are depicted in FIG. 4A to be applied as discrete beads 42, 44 forming continuous lines that do not contact each other or overlap upon application or upon settling. This arrangement of the beads inhibits mixing of the structural adhesive 12 and mastic 16 during production of the assembly 4, and allows the structural adhesive 12 and mastic 16 to independently perform their separate functions and may inhibit possible degradation resulting from the structural adhesive 12 and mastic 16 mixing with each other.

The first bead 42 of structural adhesive 12 may be, but is not required to be applied in a generally straight line as depicted. The bead 44 of the mastic 16 may be, but is not required to be, applied in a generally C-shaped line with a first leg 48 and a second leg 50 extending away at approximately right angles from a middle portion 52, as depicted.

As depicted in FIG. 4A, the beads 42, 44 at the time of application to the first component 6 may have an initial cross-sectional shape, which after a period of time, may change by settling or slumping to have a subsequent cross-sectional shape (FIG. 4B) that is more spread out on the first component 6. The initial cross-sectional shape of the beads 42, 44 can be circular as depicted in FIG. 4A, but can be in other forms, such as being square, or rectangular for example. A rectangular initial cross-sectional shape may correspond to a ribbon of structural adhesive 12 or mastic 16 being applied to the first component 6.

The first bead 42 of structural adhesive 12 is applied to a location where the interface 10 will be formed. The first bead 42 of structural adhesive 12 is applied closer to the edge 46 of the first component 6 as compared to the middle portion 52 of the bead 44 of mastic 16, while the middle portion 52 of the bead 44 of mastic 16 is applied to a location that corresponds to where the interior edge 32 will be formed.

Figure 4E:
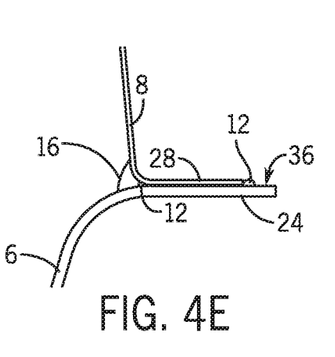
Figure 4F:
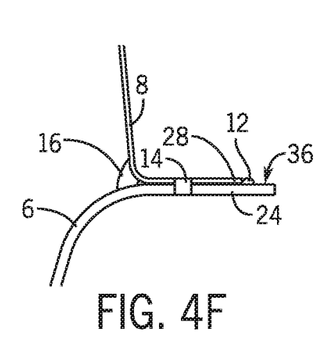
Figure 4G:
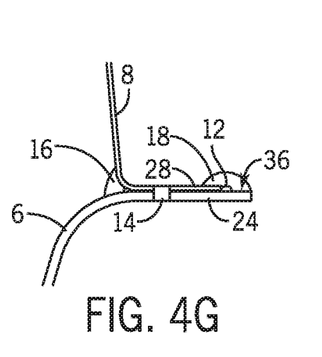

The second bead 44 of mastic 16 is applied on the first flange 24 of the first component 6 such that the mastic 16 covers at least one edge (i.e. the interior edge 32) of the interface 10 and contacts the first and second components 6, 8 when the first and second components 6, 8 are in their final setting position (FIG. 4E). The mastic 16 may also cover, and optionally contact, the structural adhesive 12 that has seeped out from between the interface 10 at the interior edge 32.

In a non-limiting example, the structural adhesive 12 and mastic 16 are applied simultaneously, e.g. by a single dispensing tool 54 including a first nozzle 56 (also referred to as "first dispensing nozzle") for dispensing the structural adhesive 12 and a second nozzle 58 (also referred to as "second dispensing nozzle") for dispensing the mastic 16.

With reference to FIGS. 5 and 6, dispensing of the first bead 42 and the second bead 44 may proceed from the first end 38 to the second end 40 of the first component 6. The first and second nozzles 56, 58 may be separated from each other by a predetermined distance, and aligned side-by-side and parallel with a width W of the first component as depicted. The first and second nozzles 56, 58 may be moved in unison with respect to the first component 6. As depicted in FIGS. 6A-6B, the first and second nozzles 56, 58 may be moved parallel with the width W of the first component 6 while the second nozzle 58 dispenses the mastic 16 to form the first leg 48 of the second bead 44. As depicted in FIGS. 6C-6D, the first and second nozzles 56, 58 are then moved along the length $L_1$ of the first component 6 toward the second end 40, while the first nozzle 56 dispenses the structural adhesive 12 to form the first bead 42 in a continuous line, and while the second nozzle 58 continues dispensing the mastic 16 to form the middle portion 52 of the second bead 44. As depicted in FIG. 6E, the first nozzle 56 stops dispensing the structural adhesive 12 near the second end 40 of the first component while the second nozzle 58 continues dispensing the mastic 16. As depicted in FIG. 6F-6G, the first and second nozzles 56, 58 may be moved parallel with the width W of the first component 6 while the second nozzle 58 dispenses the mastic 16 to form the second leg 50 of the second bead 44.

An exemplary relative arrangement and movement of the first and second nozzles 56, 58 during dispensing is depicted for example in the detailed portions of FIG. 5. The detailed portions of FIG. 5 show an exemplary first application pathway 60 for applying the first bead 42 and an exemplary second application pathway 62 for the second bead 44. The first application pathway 60 is indicated at certain locations there along by first application pathway indicators 64, and the second application pathway 62 is indicated at certain locations there along by first application pathway indicators 66.

The first and second application pathways 60, 62, and thus the first and second nozzles 56, 58, are aligned side-by-side and parallel with the width W of the first component 6, and are separated by a predetermined distance indicated by the lines connecting the first and second application pathway indicators 64, 66. As depicted, during application of the first bead 42, the first nozzle 56 moves along the first application pathway 60 by moving in order, from an initial first application pathway indicator 64A through a terminal first application pathway indicator 64O. During application of the second bead 44, the second nozzle 58 moves along the second application pathway 62 by moving in order, from an initial second application pathway indicator 66A through a terminal second application pathway indicator 66O. When the first nozzle 56 is at the initial first application pathway indicator 64A, the second nozzle 58 is at the corresponding and respective initial second application pathway indicator 66A. Likewise, when the first nozzle 56 is at indicator 64H, the second nozzle 58 is at the corresponding and respective indicator 66H. The same relative positioning is applicable for the remaining first and second application pathway indicators 64, 66. The second nozzle 58 starts dispensing the mastic 16, when the second nozzle 58 is at the initial second application pathway indicator 66A and continues dispensing until it reaches the terminal second application pathway indicator 66O. In other words, the second nozzle 58 dispenses the mastic 16 at and between indicators 66A-66O.

However, the first nozzle 56 does not start dispensing the structural adhesive 12 at the initial first application pathway indicator 64A, but instead starts dispensing when it reaches the indicator 64G and stops dispensing when it reaches the indicator 64I. In other words, the first nozzle 56 only dispenses the structural adhesive 12 at and between indicators 64G-64I.

As depicted, the first bead 42 is arranged completely inside a perimeter that is formed by the second bead 44 and an imaginary straight line 68 connecting the terminal ends of the first and second legs 48, 50.

The first and second beads 42, 44 may be monitored during application to ensure that they have desired characteristics. For example, the first and second beads 42, 44 may be monitored to ensure that one or both are continuous lines, have certain widths or heights, are positioned at a desired location on the first component 6, or have other characteristics as desired for a particular application. If intended to be discontinuous lines, the first and second beads 42, 44 may be monitored during application to ensure a proper spacing between discrete islands along the discontinuous lines, a proper size of each discrete island, placement of the islands relative to the first component 6, or other characteristics as desired for a particular application. Monitoring the first and second beads 42, 44 may be accomplished with the dispensing tool 54 as discussed in further detail herein.

The first and second beads 42, 44 may be applied by using dispensing tool 54 including an applicator head 70 as depicted FIG. 7, including the first and second nozzles 56, 58. The first and second nozzles 56, 58 are arranged on the applicator head 70 in a spaced apart fashion.

The sensors are arranged on the applicator head 70, and monitor dispensing of the first and second beads 42, 44. The sensors may include one or more lasers 72 and cameras 74. The lasers 72 may each emit light 76 toward the first and second beads 42, 44 during dispensing. The light 76 emitted by each of the lasers 72 may be a curtain of light (FIG. 7B) in the shape of a triangle. The light 76 emitted by the lasers 72 may impinge upon the first and second beads 42, 44. The lasers 72 may be arranged on the applicator head 70 such as to form a grid 78 of light 76 that forms a perimeter around the first and second nozzles 56, 58. This allows the light 76 from the lasers 72 to impinge upon the first and second beads 42, 44 no matter which direction the applicator head 70 is moving relative to the first component 6. In other words, the grid 78 of light 76 impinges upon an area that surrounds the first and second nozzles 56, 58 such that the light 76 will impinge upon the first and second beads 42, 44 as they trail away from the first and second nozzles 56, 58 during movement of the nozzles 56, 58 relative to the first component 6, and irrespective of which direction such trailing occurs.

The cameras 74 are directed at the first and second beads 42, 44 in an area impinged upon by the light 76, and monitor the light 76 impinging upon the first and second beads 42, 44. The cameras 74 may perform such monitoring by detecting for example, a reflection of the light 76 off of the first and second beads 42, 44. Similar to the lasers 72, the cameras 74 are positioned such as to monitor the perimeter around the first and second nozzles 56, 58. The cameras 74 may each monitor the perimeter by detecting the light 76 along a line on the first component 6 (FIG. 7C) where the monitored area 80 has a triangle shape; by detecting the light 76 in a circular area on the first component 6 (FIG. 7D) where the monitored volume 82 has a cone shape; or by other detection techniques.

As is understood, a change in the characteristics of the first and second beads 42, 44, such as a change in height or width of the first and second beads 42, 44, or a change in the continuity of the lines of the of the first and second beads 42, 44, will result in a change in the light 76 impinging upon the first and second beads 42, 44. If there is a change in the light 76 impinging upon the first and second beads 42, 44, then the cameras 74 will detect such a change, and may emit a signal indicating the change in the light 76. Such emitted signal may be communicated to a warning signal generator, or to an operator or observer of the dispensing tool 54 to provide an alert of the change in the first and second beads 42, 44.

The dispensing tool 54, including the applicator head 70, may be included on a robotic arm tooling. The robotic arm tooling may comprise those typically used in the production of vehicles, e.g. automobiles. Such robotic arm tooling may be of a size and configuration such that after the first and second components 6, 8 are brought together to their final setting position, the robotic arm is unable to access the interior edge 32 of the interface 10. For example as depicted in the figures, the interior edge 32 of the interface 10 is located in the interior 20 formed between the first and second components 6, 8. The location of the interior edge 32 in the interior 20, and the size and configuration of the robotic arm tooling, may prevent the robotic arm tooling from being able to apply the second bead 44 of mastic 16 to the interior edge 32. As such, the second bead 44 of mastic 16 (along with the first bead 42 of structural adhesive 12) is applied before the first component 6 is brought together with the second component 8 to their final setting position. It will be appreciated however, that the present subject matter includes an embodiment where the at least one edge that is sealed by the mastic 16 is not located in an interior of the assembly 4, and instead is accessible to the robotic arm tooling even after the first and second components 6, 8 are in their final setting position.

Application of the structural adhesive 12 and mastic 16 by the single robotic arm tooling may be accomplished in a single pass of the robotic arm tooling, where the structural adhesive 12 and the mastic 16 are applied at the same time by the robotic arm tooling. For this purpose, the dispensing tool 54 may include a first supply line 84 for delivering the structural adhesive 12 through the first nozzle 56 to the first component 6, and a second supply line 86 that is separate and distinct from the first supply line 84 and is for delivering the mastic 16 through the second nozzle 58 to the first component 6.

The first supply line 84 may be part of a first delivery pathway, which includes the first nozzle 56, and is connected to a first reservoir containing the structural adhesive 12. The second supply line 86 may be part of a second delivery pathway that is separate and distinct from the first delivery pathway, which includes the second nozzle 58, and is connected to a second reservoir containing the mastic 16. The first and second delivery pathways may include additional components for delivery of the structural adhesive 12 and mastic 16, including one or more pumps, tubes, pipes, filters, dispensing actuators, etc. The structural adhesive 12 and mastic 16 may be fluids that can be pumped from the reservoirs, flowed through the first and second delivery pathways, and ejected out of the respective nozzles. The first and second delivery pathways can thus simultaneously deliver two different materials (e.g. the structural adhesive 12 and the mastic 16) out of the respective first and second nozzles 56, 58.

The applicator head 70 may be arranged on the end of the robotic arm tooling. The first and second applicator nozzles 56, 58 may be arranged on the applicator head 70 so that they are spaced apart a predetermined distance from each other. In this way, the first bead 42 of structural adhesive 12 that is dispensed from the first nozzle 56 will be space apart from the second bead 44 of mastic 16 dispensed from the second nozzle 58 as depicted in the figures. This spaced apart configuration for the first and second applicator nozzles 56, 58 promotes equal spacing between the first and second beads 42, 44 along their entire length, and inhibits cross over and/or cross contamination of the structural adhesive 12 with the mastic 16.

The method may be performed by modifying a previously configured method of applying only the structural adhesive 12 between the first and second components 6, 8. The previously configured method may include using a robotic arm tooling to apply the structural adhesive 12 to the first component 6 by using the first delivery pathway including the first nozzle 56 arranged on the end of the robotic arm tooling. The previously configured method may be modified by introducing the second delivery pathway including the second nozzle 58 for delivering the mastic 16 to the first component 6. In modifying a previously configured method, the movement of the robotic arm tooling may not have to be altered, such as by reprogramming the movements of the robotic arm tooling. Instead, because the first and second nozzles 56, 58 are on the end of the robotic arm tooling, the first and second beads 42, 44 can be applied to the first component 6 in a single pass of the robotic arm tooling over the first component 6, and without having to reprogram movements of the robotic arm tooling and without requiring another pass of the robotic arm tooling to apply the second bead 44 with a separate pass of the robotic arm tooling.

The method includes a step of bringing the first component 6 together with the second component 8 to form the interface 10 (FIG. 4b-4C), which thereby defines the interior 20 and exterior 22. This step may include bringing the first flange 24 of the first component 6 together with the third flange 28 of the second component 8, and may also include bringing the second flange 26 of the first component 6 together with the fourth flange 30 of the second component 8. This step is performed after the first bead 42 of the structural adhesive 12 and the second bead 44 of the mastic 16 are applied to the first component 6. The first bead 42 of structural adhesive 12 is applied on the first flange 24 of the first component 6 such that the structural adhesive 12 is arranged at the interface 10 between the first and second components 6, 8 and contacts the first and second components 6, 8 when the first and second components 6, 8 are in their final setting position (FIG. 4E).

As depicted between FIGS. 4C-4E the structural adhesive 12 may spread over the width of the interface 10 as the first and second components 6, 8 are brought together toward their final setting position (FIG. 4E). In one embodiment, the structural adhesive 12 spreads out to occupy the entire interface 10 from the interior edge 32 to the exterior edge 34 when the first and second components 6, 8 reach their final setting position. Spreading out of the structural adhesive over the interface 10 may result from pressing the first and second components 6, 8 together. Depending on how much of the structural adhesive 12 is applied, the structural adhesive 12 may seep out of the interface 10 in the direction of the interior edge 32 and/or the exterior edge 34 as depicted in FIG. 4E when the first and second components 6, 8 are brought to their final setting position. However, this is not required, and the structural adhesive 12 may not occupy the entire interface 10. If applied as a ribbon, the first bead 42 of structural adhesive 12 may take up more of the interface 10 than shown in FIG. 4B upon initially bringing the first and second components 6, 8 together, and may therefore not need to spread out over the width of the interface 10 as depicted in FIGS. 4C-4E.

When the first and second components 6, 8 are brought together in this manner to form the interface 10, the interior edge 32 may be arranged in the interior 20 and thus may not be accessible to the dispensing tool 54. It may be for this reason that the second bead 44 of mastic 16 is applied before the first and second components 6, 8 are brought together. In this way, the mastic 16 can form a water-tight seal along the interior edge 32 even though the interior edge 32 is inaccessible to the dispensing tool 54 and/or robotic arm tooling. This water-tight seal along the interior edge 32 may be provided by the middle portion 52 of the second bead 44 of mastic 16. The first leg 48 of the second bead 44 of mastic 16 may form a water-tight seal along the edge of the interface 10 near the first end 38 of the first component 6; and the second leg 50 of the second bead 44 of mastic 16 may form a water-tight seal along the edge of the interface 10 near the second end 40 of the first component 6.

The method also includes a step of joining the first and second components 6, 8 together at the interface 10. This step is performed after the first flange 24 of the first component 6 is brought together with the third flange 28 of the second component 8 to their final setting position. One or more linkages 14 are used to join the first and second components 6, 8. The linkage 14 used to join the first and second components 6, 8 may be extended through the structural adhesive 12 before the structural adhesive 12 is cured. The linkages 14 extend through the first and third flanges 24, 28 to join them together, and optionally through the second and fourth flanges 26, 30 to join them together.

The method also includes a step of curing the structural adhesive 12 and the mastic 16, such that the cured mastic 16 seals the at least one edge (i.e. interior edge 32) of the interface 10. This step may be performed after joining the first and second components 6, 8 together at the interface 10. Curing may comprise one or more heating cycles that cure both the structural adhesive 12 and the mastic 16. The one or more heating cycles can include for example, those typically used in producing vehicles and vehicle assemblies. In another embodiment, one or both of the mastic 16 and structural adhesive 12 are cured by the passage of time, or by another curing agent including UV radiation, moisture, chemical initiator, or the like.

The method may also include a step of applying the dust sealer 18 (FIG. 4G) to cover at least one other edge (e.g. the exterior edge 34) of the interface 10 and curing the dust sealer 18 to seal the at least one other edge such that the cured dust sealer 18 seals the at least one other edge of the interface 10. This step may be performed after joining the first and second components 6, 8 together at the interface 10, or after curing the structural adhesive 12 and the mastic 16. A third bead 88 of the dust sealer 18 may be applied in a continuous line or in a discontinuous line with intermittent islands of dust sealer 18 applied to the exterior edge 34 along the length $L_1$ of the first component 6. In one embodiment, the third bead 88 of dust sealer 18 is applied in a continuous line in order to seal the entire exterior edge 34. The dust sealer 18 may be applied to the surface 36 of the first component 6 and on the top of the third flange 28 of the second component 8 in order to seal the exterior edge 34.

In embodiments where a robotic arm tooling is used to apply the dust sealer 18, and when the first and second components 6, 8 are in the final setting position and are joined together (FIG. 4F), the robotic arm tooling is able to access the exterior edge 34 of the interface 10. For example as depicted in the figures, the exterior edge 34 of the interface 10 is located at the exterior 22 of the assembly 4. As such, the robotic arm tooling is able to apply the dust sealer 18 to the exterior edge 34 even after the first and second components 6, 8 are joined together and after curing of the structural adhesive 12 and mastic 16.

Applying and curing the dust sealer 18 results in all edges around the perimeter of the interface 10 being sealed to thereby inhibit water or other electrolyte from entering into the interface 10 and corroding (e.g. rusting) the first and second components 6, 8 through a galvanic reaction or other reaction. Sealing of the interface 10 is maintained even if cracks or gaps are subsequently formed in the cured structural adhesive 12 during use of the assembly 4 in the vehicle 2. The seal around the perimeter of the interface 10 can be maintained because the cured mastic 16 and cured dust sealer 18 are more elastic than the cured structural adhesive 12, and therefore do not form cracks or gaps like those that may be formed in the structural adhesive 12 when subjected to stress. As with the structural adhesive 12 and mastic 16, curing of the dust sealer 18 may comprise subjecting the dust sealer 18 to one or more heating cycles, the passage of time, UV radiation, moisture, chemical initiator, or the like. In this way, the interface 10 between the first and second components 6, 8 is completely sealed on all edges, and water or other electrolyte is therefore prevented from entering into the interface 10 between the first and second components 6, 8 and causing corrosion, e.g. rust.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of joining a first component comprising a first metal and a second component comprising a second metal different from the first metal, the method including:
    applying a first bead of an adhesive and a second bead of a sealant to the first component;
    bringing the first component together with the second component such that the adhesive is arranged at an interface between the first and second components, and the sealant covers at least one edge of the interface;
    joining the first and second components together at the interface;
    after joining, applying a third bead of a sealer to the first component to cover at least one other edge of the interface;
    curing the adhesive and the sealant such that the cured sealant seals the at least one edge of the interface; and
    curing the sealer such that the cured sealer seals the at least one other edge of the interface;
    wherein after the first component and the second component are joined, the at least one edge is arranged in an interior defined by the first component and the second component; and
    wherein the joint formed by the first component and the second component form a flange joint, a butt joint, a tee joint, a corner joint or an edge joint.

2. The method according to claim 1, wherein:
    all edges of the interface are sealed by the sealer and the sealant.

3. The method according to claim 1, wherein the at least one other edge is arranged at an exterior defined by the first component and the second component.

4. The method according to claim 1, wherein the second bead and the third bead form a continuous perimeter around the first bead.

5. The method according to claim 1, wherein:
    the first component and the second component are joined to form a flange joint;
    the first and second beads are applied simultaneously by a single dispensing tool; and
    before the first component is brought together with the second component, the first bead includes a first continuous line of the adhesive, the second bead includes a second continuous line of the sealant, and the first bead does not contact the second bead.

6. The method according to claim 1, wherein:
    the second bead in applied to the first component to form a C-shaped line; and
    the first bead in arranged within a perimeter formed by the C-shaped line and an imaginary straight line extending between two ends of the C-shaped line.

7. The method according to claim 1, wherein the first and second components are joined together with at least one spot weld extending through the adhesive or with at least one mechanical fastener extending through the adhesive.

8. The method according to claim 1, wherein:
    one of the first metal and the second metal comprises aluminum; and
    the other of the first metal and the second metal comprises steel.

9. A method of joining a first component comprising a first metal and a second component comprising a second metal different from the first metal, the method including:
    applying a first bead of an adhesive and a second bead of a sealant to the first component;
    bringing the first component together with the second component such that the adhesive is arranged at an interface between the first and second components, and the sealant covers at least one edge of the interface;
    joining the first and second components together at the interface;
    after joining, applying a third bead of a sealer to the first component to cover at least one other edge of the interface;
    curing the adhesive and the sealant such that the cured sealant seals the at least one edge of the interface; and
    curing the sealer such that the cured sealer seals the at least one other edge at the interface;
    wherein after the first component and the second component are joined, the at least one edge is arranged in an interior by the first component and the second component; and
    wherein the joint formed by performing only these steps produces a completed joint.

* * * * *